United States Patent [19]

Butcher et al.

[11] 4,216,674
[45] Aug. 12, 1980

[54] LIQUID FLOW METER

[75] Inventors: Alan G. Butcher, Wokingham; Chan-Po Wong, Maidenhead, both of England

[73] Assignee: Dresser Europe, S.A., Brussels, Belgium

[21] Appl. No.: 875,466

[22] Filed: Feb. 3, 1978

Related U.S. Application Data

[63] Continuation of Ser. No. 732,291, Oct. 14, 1976, abandoned.

[30] Foreign Application Priority Data

Oct. 15, 1975 [GB] United Kingdom ............... 42363/75

[51] Int. Cl.² .......................... G01F 1/90; G01F 15/02
[52] U.S. Cl. .................................................. 73/861.01
[58] Field of Search ................. 73/198, 228, 233, 344, 73/432 A

[56] References Cited

U.S. PATENT DOCUMENTS

| 335,213 | 2/1886 | Brown | 73/228 |
|---|---|---|---|
| 2,082,539 | 6/1937 | Fischer | 73/228 |
| 2,468,896 | 5/1949 | Rohn | 73/228 |
| 3,088,372 | 5/1963 | Steen | 73/233 |
| 3,318,150 | 5/1967 | Rose | 73/233 |
| 3,721,125 | 3/1973 | Kugler | 73/233 |
| 3,982,436 | 9/1976 | Friebel | 73/233 |

FOREIGN PATENT DOCUMENTS 415400 6/1925 Fed. Rep. of Germany ............ 73/228

Primary Examiner—Herbert Goldstein
Attorney, Agent, or Firm—Daniel Rubin

[57] ABSTRACT

A temperature compensator for a liquid flow meter. A bellows unit is mounted in the conduit carrying the liquid measured and an output from the bellows unit is taken to a disc-and-wheel mechanical compensator by means of a flexible cable drive. An adjustable pivot lever coupling allows adjustment of the drive ratio to the compensator according to the nature of the liquid.

2 Claims, 4 Drawing Figures

4,216,674

LIQUID FLOW METER

This is a continuation of application Ser. No. 732,291, filed Oct. 14, 1976, now abandoned.

The invention relates to a liquid flow meter and particularly to a temperature compensation device for use in association with such a flow meter.

BACKGROUND OF THE INVENTION

Liquid flow meters have application in many fields for measuring the flow of liquid through conduits. The true mass flow of liquid through a conduit depends upon the temperature of the liquid, since the liquid expands with temperature. The temperature of the liquid may vary because of changes in ambient temperature or because of artificial heating to improve efficiency of pumping in the case of liquids which have high viscosity at low temperatures. Accordingly, there is a requirement to provide compensation in the output of a flow meter in accordance with the temperature of the liquid.

A temperature-dependent mechanical output has been achieved hitherto by the use of a fluid-filled capsule immersed in the liquid of which the flow is being measured. The capsule is coupled to a remote bellows unit by capillary tubing and the variation of expansion of the fluid by virtue of the temperature of the liquid changes the pressure on the bellows and thus effects a mechanical movement. However, ambient temperature changes at the bellows unit and the capillary tubing also produce mechanical movement which would give rise to an error. Compensation for such ambient temperature changes of the bellows unit and capillary tubing has been effected by providing a second sealed bellows arrangement in tandem with the first and assembled in such a way that changes in ambient temperature are compensated for. Such a prior arrangement is convenient in that the small diameter capillary tubing makes it possible to mount the capsule in a convenient position and allows easy coupling to a flow indicator compensation arrangement. However, the provision of a second bellows arrangement for the correction of ambient temperature effects is unduly complex. The present invention seeks to provide an improved temperature compensating arrangement.

SUMMARY OF THE INVENTION

According to the invention there is provided a liquid flow meter having a drive adapted to be driven by a liquid, the flow rate of which is to be measured; a flow indicator output; a calibration control coupled between the drive and the indicator output; an input of the calibration control which is adjustable to vary the drive ratio between the drive and the indicator output; a temperature control capsule for immersion in the flowing liquid, the capsule including a bellows unit which contracts and extends in accordance with the temperature of the liquid; and a flexible cable comprising an outer sleeve anchored at one end to the capsule and at the other end to the calibration control and an inner cable coupled at one end to the bellows unit and at the other end to the input of the calibration control. It will be seen that with this arrangement the bellows unit is not remote from the capsule and is immersed in the liquid. There is, therefore, no need to compensate for ambient temperature changes at the bellows unit. Instead of providing a pressure output in a capillary tube, the present invention provides a direct mechanical output via a flexible cable which has the same virtue of easy fitting as does a capillary tube.

Different liquids have different temperature coefficients of expansion and a preferred feature of the present invention provides means coupling the flexible cable to the input of the calibration control, which coupling means is effective to adjust the ratio between linear movement of the inner cable of the flexible cable and corresponding linear movement of the input to the calibration control. Preferably, the adjustable coupling comprises a lever to which the inner cable of the cable and the input to the calibration control are coupled at opposite ends and a pivot which is slidable along the lever. The position of the pivot will adjust the effect of the cable movement on the input to the calibration control. The position of the slidable pivot can be set in accordance with the nature of the liquid flowing.

In a preferred embodiment of the present invention the calibration control comprises a disc and wheel arrangement, the wheel being driven frictionally by the disc at a rate dependent upon the position of the wheel on the disc. A differential unit receives one input from the wheel and another input from the output of the flow meter. The output from the flow meter also drives the disc. The output from the differential drives the indicator. The arrangement is such that the output from the flow meter is applied through the differential to the indicator and a small proportion is subtracted in the differential, the proportion being determined by the position of the wheel on the disc. The wheel position is determined by the drive applied through the flexible cable.

BRIEF DESCRIPTION OF THE INVENTION

The invention will further be described with reference to the accompanying drawings, of which:

DETAILED DESCRIPTION OF THE INVENTION

Figure 1:
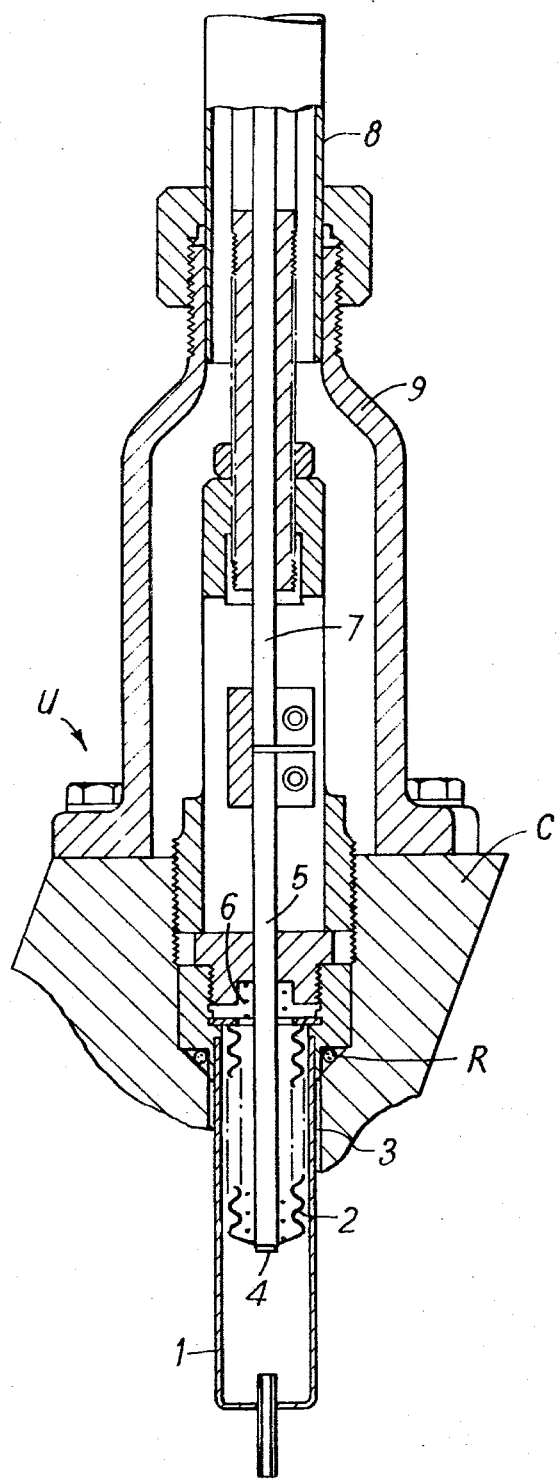
FIG. 1 is a cross-sectional view of the temperature compensation capsule of a flow meter in accordance with the invention.

Referring to FIG. 1 there is shown in cross-section part of the wall of a conduit C which carries a liquid, the flow of which is to be measured. The wall of the conduit is drilled so that liquid flowing in the conduit enters a bore 3. The bore is blocked by a temperature compensation unit U which is threaded into the wall of the conduit and sealed by an O-ring R. The unit U has a capsule 1 which is clear of the wall of the bore 3 and is therefore immersed in the flowing liquid. The capsule 1 contains an operating fluid which exerts pressure on the end 4 of an operating rod 5. The rod is sealed to the wall of the capsule by a bellows unit 2 and is urged downwardly (as seen in the Figure) by a coil spring 6. As the temperature of the operating fluid in the capsule increases, the pressure on the end 4 of the rod 5 increases and the rod is moved against the action of spring 6. The position of the rod 5 depends upon the temperature of the flowing liquid.

The end 4 of the rod 5 is coupled to an inner cable 7 of a flexible cable which has a flexible outer sleeve 8. This sleeve 8 is fixed to the body 9 of the unit U.

Figure 2:
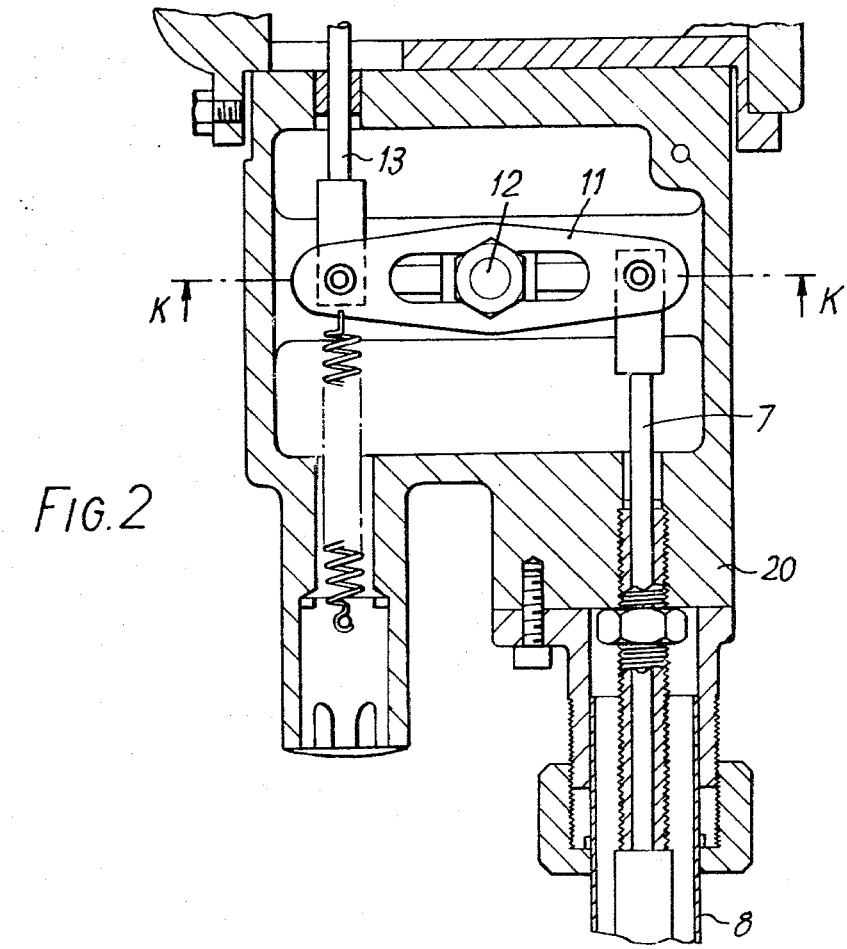
FIG. 2 is a cross-sectional view of the input coupling to the calibration control of the flow meter embodying the capsule of FIG. 1.

Referring now to FIG. 2, there is shown the connection for the other end of the flexible cable. The flow meter has a vane arrangement (not shown) which is driven by the flowing fluid to rotate an output shaft in accordance with the flow of the fluid. The output shaft is coupled to drive an indicator output, and between the drive and the indicator output is an adjustable calibration control. The control comprises a disc 30 driven by an input shaft 25 (FIG. 4) which is turned by the drive from the vane arrangement. The disc drives a wheel 31 which makes frictional contact with one face 30a of the disc 30 and which is movable radially over the disc face. The radial movement of the wheel is controlled by movement of a sleeve 15 which is fixed to the wheel and which is threaded on a rod 13. Rod 13 is coupled to one end of a lever 11. The other end of the lever 11 is coupled to the inner cable 7 of the flexible coupling (FIG. 1). The outer sleeve 8 of the flexible coupling is fixed to a casing 20 which houses the lever 11 and which is fixed to the casing of the calibration control. The lever 11 pivots about a pivot 12, and it will be seen that the linear movement of the inner cable 7 produces a corresponding linear movement of the rod 13 and thus of the wheel 31.

Figure 3:
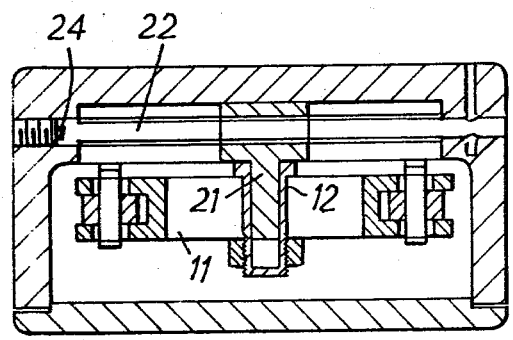
FIG. 3 is a section taken at K—K of FIG. 2.

Because of the different temperature co-efficients of expansion of different liquids, the amount of movement of wheel 31 necessary for a given temperature rise will be different for different liquids. In order to allow for this, the pivot 12 is movable along the lever 11. FIG. 3 shows a section taken at K—K of FIG. 2 and illustrates the manner in which the pivot is movable. It will be seen that the pivot 12 is mounted on a stub 21 which is threaded on a threaded rod 22. Movement of the stub 21 and thus the sleeve which constitutes pivot 12 along the rod 22 is effected by turning the rod 22 by means of a screwdriver in a screwdriver slot 24. Thus, the compensation co-efficient for a given liquid can be set by manipulation of the pivot position for the lever 11.

Figure 4:
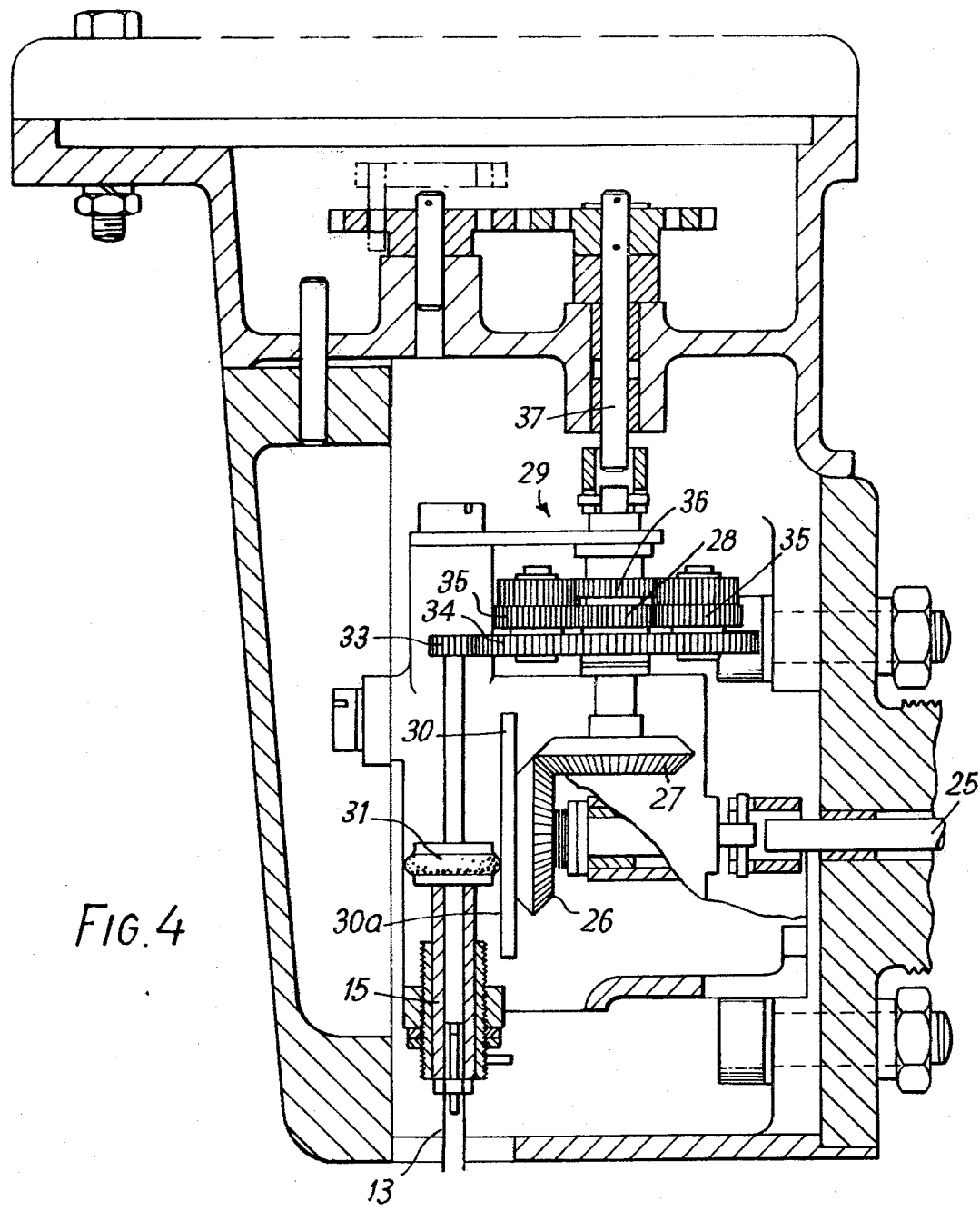
FIG. 4 is a cross-sectional view of the calibration control of the flow meter.

As further shown in FIG. 4, the shaft 25 drives bevel gears 26 and 27, and the gear 27 is coupled to drive an input sun gear 28 of a differential 29. The disc 30 is fixed to gear 26 and drives the wheel 31. Wheel 31 drives a gear 33 which is coupled to the cage gear 34 of the differential 29. The wheel 34 carries the planet gears 35 and assists in driving on output sun gear 36 of the differential. This gives a final drive via a shaft 37. The shaft 37 is coupled to drive the fluid flow indicator (not shown) directly.

The basic drive for the output from the meter is thus given by shaft 25 through the differential to shaft 37. However, an adjustable decrement is subtracted from this drive by means of the friction wheel 31 and the differential 29. The component subtracted is adjustable by linear movement of the wheel 31 under control of the shaft 13 as described. It is to be noted that the contribution of the friction wheel is subtracted rather than added to the drive and this has the advantage of allowing a greater torque load to be transmitted by the calibrating mechanism, since the torque reaction created by the counter and accessories being driven by the calibrator tends to assist rather than oppose the operation of the wheel and disc mechanism.

We claim:

1. A temperature responsive fluid flow meter for determining the rate of fluid flow through a conduit, said meter comprising:
    input shaft means to be positioned in the fluid conduit for rotating in response to the flow of fluid through the conduit;
    flow rate indicator means for indicating the rate of fluid flow in the conduit;
    differential means connected between said input shaft means and said indicator means for driving said indicator means in response to the rotation of said input shaft means;
    adjustable calibration control means connected to said differential means for adjusting the drive ratio of said differential means; and
    temperature control means connected to said calibration means to be operatively positioned in the flow of fluid being metered for regulating said calibration means in correlation with the temperature of the fluid, said temperature control means being comprised of:
    capsule means substantially affording the entire temperature responsive sensing for the regulating input to said calibration control means, and adapted for immersion in the flowing fluid, said capsule means comprising a fluid tight enclosure with respect to the flowing fluid and containing a bellows unit surrounded by an enclosed volume of fluid fill for said bellows unit to contract and expand in accordance with changes in the temperature of the metered fluid conducted through said capsule means enclosure and fluid fill therein, and
    a flexible cable connecting said capsule means and said calibration control means, said flexible cable having
    a flexible outer sleeve operatively anchored at one end to said capsule means, and
    a flexible inner cable through said outer sleeve operatively connecting at one end to said bellows unit and at the other end to said calibration control means;
    said calibration control means being comprised of:
        a disc on the end of said input shaft means,
        a rotatable wheel radially contacting said disc, and
        a rotatable shaft supporting said wheel and operatively connected to said flexible inner cable of said temperature control means and to said differential means; and
    said differential means being comprised of:
        an output shaft means connected to said indicator means for operating said indicator means,
        first and second gears operatively connected to said output shaft and rotatable therewith;
        first gear means on said input shaft means for transferring the motion of said input shaft to said first gear, and
        second gear means on said rotatable shaft supporting said wheel for transferring the rotational motion of said shaft to said second gear.

2. A meter as claimed in claim 1 wherein the motion of said second gear means is subtracted from the motion of said first gear means.

* * * * *